(12) United States Patent
Nakakubo et al.

(10) Patent No.: US 8,348,217 B2
(45) Date of Patent: Jan. 8, 2013

(54) BASE ISOLATION TABLE WITH DAMPING MECHANISM AND BASE ISOLATION TABLE UNIT USING THE SAME

(75) Inventors: Keisuke Nakakubo, Tokyo (JP); Hiroaki Asakura, Tokyo (JP); Takashi Ogata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/381,813

(22) PCT Filed: Aug. 10, 2010

(86) PCT No.: PCT/JP2010/063544
§ 371 (c)(1), (2), (4) Date: Dec. 30, 2011

(87) PCT Pub. No.: WO2011/024642
PCT Pub. Date: Mar. 3, 2011

(65) Prior Publication Data
US 2012/0097825 A1    Apr. 26, 2012

(30) Foreign Application Priority Data

Aug. 24, 2009    (JP) ................................ 2009-192913

(51) Int. Cl.
*F16M 13/00* (2006.01)
(52) U.S. Cl. ...................................... 248/562; 52/167.7
(58) Field of Classification Search ................. 248/562, 248/560, 580, 602, 638; 52/167.1, 167.2, 52/167.6, 167.7, 167.8; 108/21, 57.12
See application file for complete search history.

(56) References Cited

U.S. PATENT DOCUMENTS 4,596,373 A * 6/1986 Omi et al. .................... 248/562

(Continued)

FOREIGN PATENT DOCUMENTS

JP    8-159203 A    6/1996

(Continued)

OTHER PUBLICATIONS

International Search Report of PCT/JP2010/063544, mailing date Oct. 26, 2010.

*Primary Examiner* — Ramon Ramirez
*Assistant Examiner* — Todd M Epps
(74) *Attorney, Agent, or Firm* — Westerman, Hattori, Daniels & Adrian, LLP

(57) ABSTRACT

Provided are a vibration isolating table (1) with damping mechanism having initial rigidity so that a vibration isolation subject is not swayed under a state in which no vibrations act, and configured to function in a case where vibrations act so that the vibration isolation subject can be protected, and a vibration isolating table unit (15) using the vibration isolating table (1). The vibration isolating table includes a fixed plate (2); a guiding member (42) provided so as to be freely movable in an X direction relative to the fixed plate (2); a movable plate (3) provided so as to be freely movable relative to the guiding member (42) in a Y direction orthogonal to the X direction; an X-directional circulation belt (6) configured to circulate in accordance with X-directional movement of the guiding member (42) relative to the fixed plate (2); a Y-directional circulation belt (9) configured to circulate in accordance with Y-directional movement of the movable plate (3) relative to the guiding member (42); and rotary dampers (7, 10) respectively provided to the fixed plate (2) and the movable plate (3), and respectively including rotationally driven members (70, 100) around which the X-directional circulation belt (6) and the Y-directional circulation belt (9) are respectively looped, the rotary dampers (7, 10) being configured to respectively impart resistance to rotational motion of the rotationally driven members (70, 100).

8 Claims, 5 Drawing Sheets

U.S. PATENT DOCUMENTS

| | | | |
|---|---|---|---|
| 5,496,167 A * | 3/1996 | Diaz | 425/456 |
| 6,385,917 B1 | 5/2002 | Konomoto | |
| 7,237,364 B2 * | 7/2007 | Tsai | 52/167.6 |

FOREIGN PATENT DOCUMENTS

| | | |
|---|---|---|
| JP | 10-169710 A | 6/1998 |
| JP | 2000-240719 A | 9/2000 |
| JP | 2000-297841 A | 10/2000 |
| JP | 2001-153179 A | 6/2001 |
| JP | 2002-155640 A | 5/2002 |
| JP | 2006-153210 A | 6/2006 |
| JP | 2007-010110 A | 1/2007 |

* cited by examiner

BASE ISOLATION TABLE WITH DAMPING MECHANISM AND BASE ISOLATION TABLE UNIT USING THE SAME

TECHNICAL FIELD

The present invention relates to a vibration isolating table with damping mechanism, which is interposed between vibration isolation subjects such as a precision apparatus, an electronic apparatus, and an art object and a floor surface of a building, and to be used for the purpose of protecting the vibration isolation subjects from external vibrations such as an earthquake, and to a vibration isolating table unit using the vibration isolating table.

BACKGROUND ART

Conventionally, as a measure against vibrations to be caused when transporting vibration isolation subjects such as a precision apparatus, an electronic apparatus, and an art object, or as a measure against external vibrations such as an earthquake in a case where the vibration isolation subjects are placed in a building, a vibration isolating table has been used for the purpose of isolating those vibration isolation subjects from vibrations of a floor surface.

As such type of vibration isolating table, the vibration isolating table disclosed in JP 2000-240719 A is known. This vibration isolating table is a two-dimensional vibration isolating table including a Y-directional vibration isolating part and an X-directional vibration isolating part which are overlaid one on top of the other relative to the floor surface. The topmost placement table part is freely movable in the X direction and the Y direction relative to the floor surface.

The Y-directional vibration isolating part includes a guiding member fixed to the floor surface, a Y-directional rail that is held so as to be freely movable in the Y direction by the guiding member and is fixed to an intermediate plate, and a plurality of elastic members provided between the intermediate plate and the floor surface so as to hold the intermediate plate at the initial position on the floor surface. Further, the X-directional vibration isolating part includes a guiding member fixed to the intermediate plate of the Y-directional vibration isolating part, an X-directional rail that is held so as to be freely movable in the X direction by the guiding member and is fixed to the placement table part, and a plurality of elastic members provided between the placement table part and the intermediate plate so as to hold the placement table part at the initial position on the intermediate plate.

In the vibration isolating table structured as described above, in a case where vibrations act on the floor surface, the Y-directional vibration isolating part and the X-directional vibration isolating part interact with each other to isolate, from the vibrations of the floor surface, the placement table part on which a vibration isolation subject is placed, and the cycle of the vibrations of the placement table part is set sufficiently long, with the result that the sway of the vibration isolation subject can be suppressed. Further, when the vibrations of the floor surface cease and the vibrations of the placement table part also cease, the placement table part is pulled back to the initial position due to the tensile force of the elastic members.

Further, the conventional vibration isolating table is provided with a damping mechanism for quickly ceasing the vibrations of the placement table part. The damping mechanism is provided both to the Y-directional vibration isolating part and to the X-directional vibration isolating part. The damping mechanism of the Y-directional vibration isolating part includes a frictional member that is opposed to the side surfaces of the Y-directional rail through the intermediation of small gaps and is held so as to be freely rotatable relative to the floor surface, and each of the elastic members is stretched between one end of the frictional member and the intermediate plate. The damping mechanism of the X-directional vibration isolating part has a similar structure, that is, the damping mechanism of the X-directional vibration isolating part includes a frictional member that is opposed to the side surfaces of the X-directional rail through the intermediation of small gaps and is held so as to be freely rotatable relative to the intermediate plate, and each of the elastic members is stretched between one end of the frictional member and the placement table part.

In the damping mechanism structured as described above, when the intermediate plate moves in the Y direction relative to the floor surface or when the placement table part moves in the X direction relative to the intermediate plate, the frictional member rotates due to the tensile force of the elastic members so that the frictional member is brought into press contact with the Y-directional rail or the X-directional rail. As a result, a frictional resistance force is generated. As the distance of movement of the intermediate plate relative to the floor surface becomes larger or as the distance of movement of the placement table part relative to the intermediate plate becomes larger, the elastic members exert a larger tensile force, and hence the frictional resistance force generated between the frictional member and each rail also becomes larger.

In other words, in the vibration isolating table disclosed in JP 2000-240719 A, as the placement table part moves farther away from the initial position, a larger damping force acts on the vibrations of the placement table part.

CITATION LIST

Patent Literature

Patent Literature 1: JP 2000-240719 A

DISCLOSURE OF THE INVENTION

Problems to be Solved by the Invention

However, in the above-mentioned conventional vibration isolating table with damping mechanism, for example, under a state in which vibrations do not act from the floor surface onto the vibration isolation subject and the placement table part is set at the initial position in the X direction and also in the Y direction, the frictional member is not brought into press contact with both the X-directional rail and the Y-directional rail, and hence no frictional resistance force acts between the frictional member and each rail. Therefore, the rigidity of the placement table part situated at the initial position is insufficient, and hence the placement table part moves relative to the floor surface even when the floor surface slightly vibrates, which leads to an inconvenience that the vibration isolation subject is easily swayed relative to the floor surface.

Means for Solving the Problems

The present invention has been made in view of the above-mentioned problem, and it is therefore an object of the present invention to provide a vibration isolating table with damping mechanism having initial rigidity so that a vibration isolation subject is not swayed under a state in which no vibrations act, and configured to function reliably in a case where large vibrations such as an earthquake act so that the vibration isolation subject can be protected, and to provide a vibration isolating table unit using the vibration isolating table.

In order to achieve the above-mentioned object, the present invention provides a vibration isolating table with damping mechanism, including: a fixed plate; a guiding member provided so as to be freely movable in an X direction relative to the fixed plate; a movable plate on which a vibration isolation subject is to be placed, the movable plate being provided so as to be freely movable relative to the guiding member in a Y direction orthogonal to the X direction, and freely movable within a plane parallel to the fixed plate; a plurality of elastic members provided between the fixed plate and the guiding member and between the movable plate and the guiding member, the plurality of elastic members being configured to pull the movable plate shifted relative to the fixed plate back to an initial position; an X-directional circulation belt stretched on the fixed plate into a circular shape along a predetermined path, the X-directional circulation belt being configured to circulate in accordance with X-directional movement of the guiding member relative to the fixed plate; a Y-directional circulation belt stretched on the movable plate into a circular shape along a predetermined path, the Y-directional circulation belt being configured to circulate in accordance with Y-directional movement of the movable plate relative to the guiding member; rotary dampers respectively provided to the fixed plate and the movable plate, and respectively including rotationally driven members around which the X-directional circulation belt and the Y-directional circulation belt are respectively looped, the rotary dampers being configured to respectively impart resistance to rotational motion of the rotationally driven members.

Effects of the Invention

In the above-mentioned vibration isolating table with damping mechanism according to the present invention, the movable plate is freely movable in the X direction and in the Y direction relative to the fixed plate through the intermediation of the guiding member. When vibrations such as an earthquake act on the fixed plate, the movable plate may vibrate irrespective of the vibrations acting on the fixed plate, and the vibration isolation subject placed on the movable plate can be isolated from the vibrations acting on the fixed plate. At this time, when the movable plate moves in the X direction and in the Y direction relative to the fixed plate, the X-directional circulation belt and the Y-directional circulation belt circulate in accordance with the movement in the predetermined path along which the X-directional circulation belt and the Y-directional circulation belt are stretched, to thereby transmit the rotational motion to the rotationally driven members provided to the rotary dampers. The rotary dampers impart the resistance to the rotational motion of the rotationally driven members, and thus the X-directional and Y-directional vibrations of the movable plate are damped.

The rotary dampers impart the resistance to the rotational motion of the rotationally driven members, and hence, under a state in which the movable plate is set at the initial position without vibrating relative to the fixed plate, the rotary dampers impart initial rigidity to the movable plate. Therefore, it is possible to prevent the sway of the movable plate relative to the fixed plate as long as large vibration energy is not input due to an earthquake or the like.

MODE FOR CARRYING OUT THE INVENTION

Hereinafter, referring to the accompanying drawings, detailed description is given of a vibration isolating table with damping mechanism and a vibration isolating table unit using the vibration isolating table according to the present invention.

Figure 1:
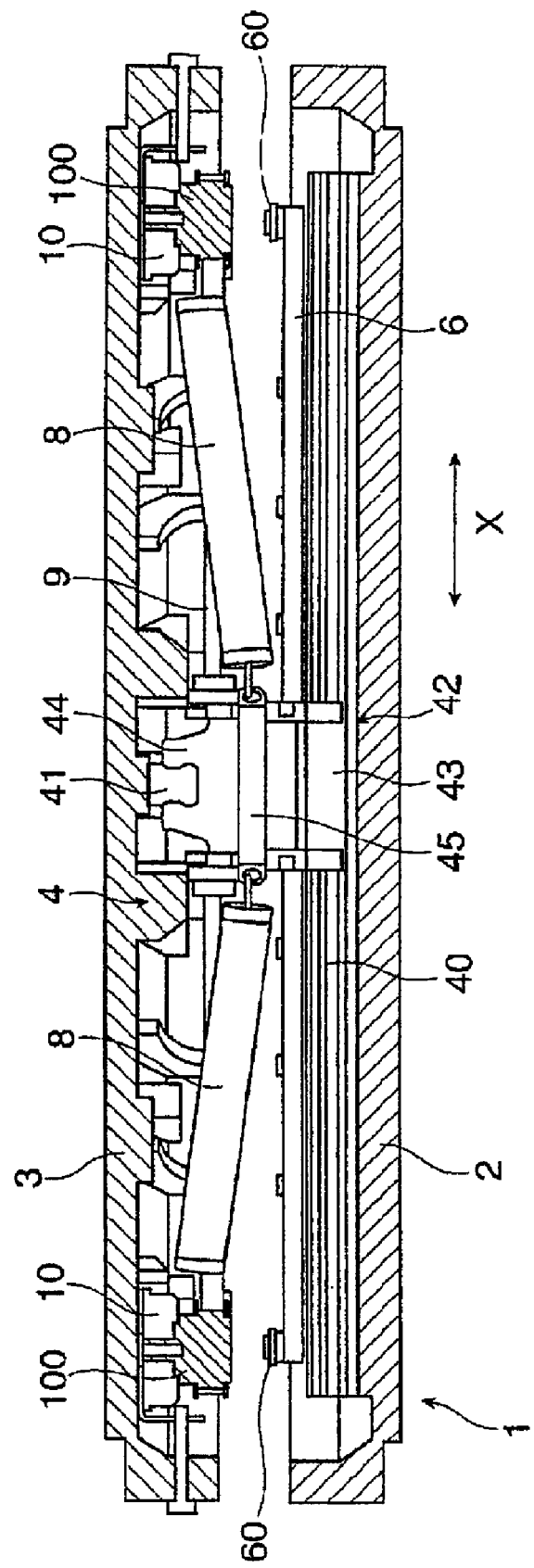
FIG. 1 A partial sectional front view illustrating an example of an embodiment of a vibration isolating table with damping mechanism to which the present invention is applied.

FIG. 1 is a sectional front view illustrating an example of a vibration isolating table 1 with damping mechanism to which the present invention is applied. The vibration isolating table 1 with damping mechanism (hereinafter, referred to as "dumping vibration isolating table 1") includes a fixed plate 2 to be installed on the floor surface, a movable plate 3 on which a vibration isolation subject requiring vibration isolation is to be placed, the vibration isolation subject being typified by a precision apparatus, an electronic apparatus, and an art object, and a two-dimensional guiding mechanism 4 for freely moving the movable plate 3 relative to the fixed plate 2 in an X direction and a Y direction (direction toward the back side of the drawing sheet of FIG. 1) orthogonal to the X direction. Note that, the example of application of the present invention is not limited to the dumping vibration isolating table 1 illustrated in FIG. 1.

The two-dimensional guiding mechanism 4 includes a lower guiding rail 40 laid on the fixed plate 2 along the X direction, an upper guiding rail 41 fixed to the movable plate 3 on its lower surface side along the Y direction, and a guiding member 42 that takes motion along both the lower guiding rail 40 and the upper guiding rail 41. Further, the guiding member 42 includes a lower slidable block 43 mounted onto the lower guiding rail 40 through the intermediation of a large number of rolling elements, an upper slidable block 44 mounted onto the upper guiding rail 41 through the intermediation of a large number of rolling elements, and a coupling plate 45 having the slidable blocks 43 and 44 fixed to the front and back surfaces thereof.

As a combination of the lower guiding rail 40 and the lower slidable block 43 and a combination of the upper guiding rail 41 and the upper slidable block 44, a commercial linear guiding device may be used. For example, the linear guiding device includes a large number of rolling elements, a guiding rail having a rolling surface for the rolling elements formed along a longitudinal direction thereof, and a slidable block having an infinite circulation path for the rolling elements and mounted so as to be freely movable along the guiding rail. From the viewpoint of preventing separation of the movable plate 3 from the fixed plate 2, it is desired that the slidable blocks 43 and 44 can respectively receive any loads acting on the planes orthogonal to the longitudinal directions of the guiding rails 40 and 41 under a state in which the slidable blocks 43 and 44 are respectively mounted onto the guiding rails 40 and 41. Further, the load capacity of each of the lower slidable block 43 and the upper slidable block 44 may be selected as appropriate depending on the weight of the vibration isolation subject to be placed on the movable plate 3.

The movable plate 3 is overlaid on the fixed plate 2 through the intermediation of the two-dimensional guiding mechanism 4. The guiding member 42 freely moves in the X direction relative to the fixed plate 2, and further, the movable plate 3 freely moves in the Y direction relative to the guiding member 42, with the result that the movable plate 3 is freely movable in the X direction and in the Y direction relative to the fixed plate 2. Accordingly, when vibrations act from the floor surface onto the fixed plate 2 installed on the floor surface, the movable plate 3 may freely vibrate in the X direction and in the Y direction in a cycle different from that of the fixed plate 2.

Figure 2:
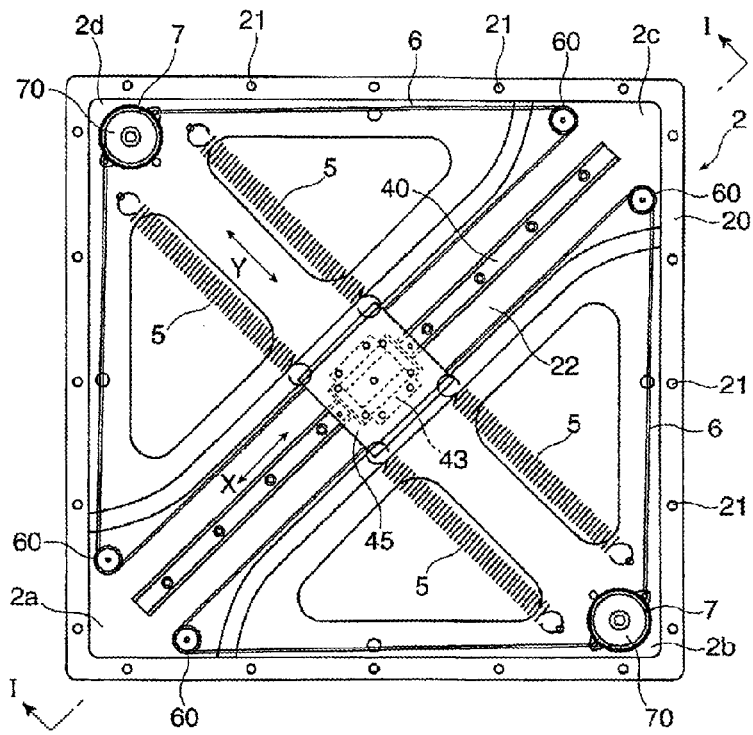
FIG. 2 A plan view illustrating a structure on a fixed plate side of the vibration isolating table with damping mechanism illustrated in FIG. 1.

FIG. 2 is a plan view illustrating a state in which the fixed state of the upper slidable block 44 with respect to the coupling plate 45 of the guiding member 42 is released and the movable plate 3 is removed from the fixed plate 2. The fixed plate 2 is manufactured by die casting using an aluminum alloy, and has a square shape as illustrated in FIG. 2. Along the four side edges surrounding the fixed plate 2, a flange portion 20 is provided so as to increase the strength of the fixed plate 2. In the flange portion 20, there are formed tapped holes 21 to be used for coupling to another dumping vibration isolating table or an inertial mass table when constructing a vibration isolating table unit to be described later.

The fixed plate 2 includes a fixed base portion 22 of the lower guiding rail, which is provided between a corner portion 2a and a corner portion 2c situated diagonally, and the lower guiding rail 40 is arranged on this fixed base portion 22. In other words, in FIG. 2, the diagonal line connecting the corner portion 2a and the corner portion 2c matches with the X direction. Further, on both sides of the lower guiding rail 40 laid on the fixed base portion 22, ribs 23 for reinforcing the fixed base portion 22 are provided. The lower slidable block 43 is mounted onto the lower guiding rail 40 so as to straddle the lower guiding rail 40, and is freely reciprocable between the corner portion 2a and the corner portion 2c of the fixed plate 2. Note that, the coupling plate 45 is fixed onto the lower slidable block 43, and hence in FIG. 2, the lower slidable block 43 is illustrated by the broken lines.

Further, between corner portions 2b and 2d of the fixed plate 2 situated on the lateral side of the lower guiding rail 40 and the coupling plate 45 fixed to the lower slidable block 43, a plurality of elastic members 5 formed of coil springs are provided, respectively. Those elastic members 5 are stretched so that their tensile force is reduced most greatly when the lower slidable block 43 is set at the center position of the fixed plate 2 (hereinafter, referred to as "initial position").

Figure 3:
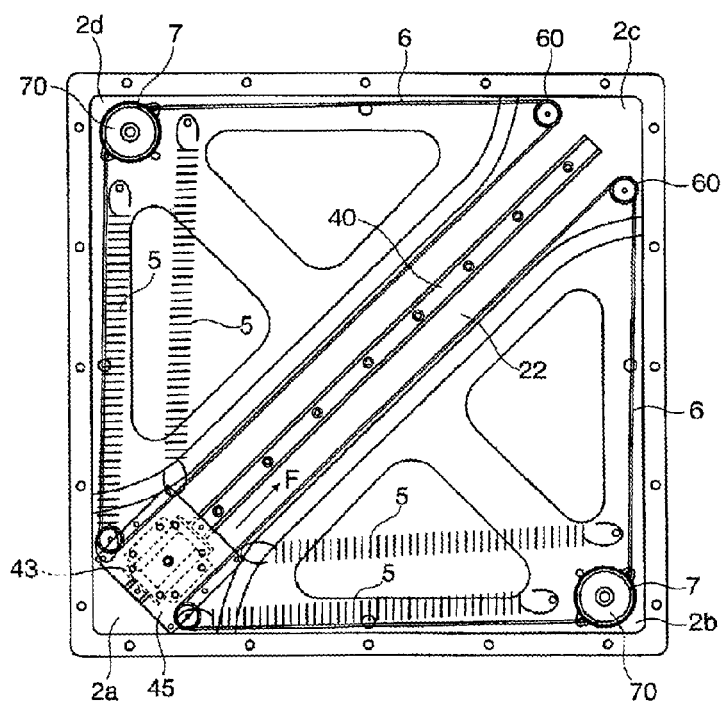
FIG. 3 A plan view illustrating a state of the fixed plate side of the vibration isolating table with damping mechanism illustrated in FIG. 1 at the time when the vibration isolating table is operating.

FIG. 3 is a view illustrating a state in which the lower slidable block 43 moves along the lower guiding rail 40 from the initial position to the end portion of the lower guiding rail 40. When the lower slidable block 43 moves in this manner from the initial position toward any one of the end portions of the lower guiding rail 40, the tensile force of each elastic member 5 increases, and therefore a force F for pulling the lower slidable block 43 back to the initial position acts on the lower slidable block 43. Therefore, when the lower block shifts from the initial position, the lower block then vibrates in the X direction with the initial position set as the center of the amplitude.

Note that, in the example illustrated in FIG. 2, the elastic members 5 are arranged in pairs on both sides of the lower guiding rail 40, but the number of the elastic members 5 may be changed as appropriate in consideration of the weight of the vibration isolation subject to be placed on the movable plate 3, resistance to the movement of the lower slidable block 43 relative to the lower guiding rail 40, and the like.

Meanwhile, a pair of X-directional circulation belts 6 are connected to the coupling plate 45. In this embodiment, the X-directional circulation belts 6 are timing belts provided with teeth at constant intervals along the longitudinal direction. The fixed base portion 22 is provided with driven rollers 60 corresponding to both longitudinal ends of the lower guiding rail 40, and the X-directional circulation belts 6 are looped around those driven rollers 60. In other words, the X-directional circulation belts 6 are each stretched while including a path parallel to the lower guiding rail 40.

Further, rotary dampers 7 are fixed at the corner portions 2b and 2d of the fixed plate 2 situated on the lateral side of the lower guiding rail 40. The X-directional circulation belts 6 are looped also around rotationally driven members 70 provided to the rotary dampers 7, respectively. Thus, the X-directional circulation belts 6 are each stretched into a circular shape along a substantially triangular path on the lateral side of the lower guiding rail 40. When the coupling plate 45 moves in the X direction together with the lower slidable block 43, the X-directional circulation belts 6 connected to the coupling plate 45 circulate and move along the path, to thereby impart rotational motion to the rotationally driven members 70 provided to the rotary dampers 7 in accordance with the X-directional movement amount of the coupling plate 45.

The rotary dampers 7 each include a case fixed to the fixed plate 2 and having an action chamber filled with a viscous fluid, and a rotor freely rotatable inside the action chamber of the case and coupled to the rotationally driven member 70. When the rotor rotates relative to the case, the shearing frictional force of the viscous fluid acts as rotational resistance to the rotation, and thus the rotational resistance is imparted to the rotationally driven member 70 coupled to the rotor.

The rotational resistance generated by the rotary damper 7 acts on the circulatory movement of the X-directional circulation belt 6, and eventually acts as a resistance force to the X-directional movement of the lower slidable block 43. In other words, the X-directional vibrations of the lower slidable block 43 are damped by the rotary damper 7.

Note that, as the rotary damper 7, one of various commercial rotary dampers may be selected and used as appropriate depending on the required resistance force as long as the rotary damper imparts resistance to the rotation of the rotationally driven member 70. At this time, from the viewpoint of housing the rotary damper 7 in the gap between the fixed plate 2 and the movable plate 3 and maintaining a lower height of the movable plate 3 relative to the floor surface, it is preferred that the rotary damper 7 be low in height in the rotational axis direction.

Meanwhile, similarly to the above-mentioned fixed plate 2, the movable plate 3 to be overlaid on the fixed plate 2 is manufactured by die casting using an aluminum alloy, and has the same shape as the fixed plate 2. Note that, as illustrated in FIG. 1, the movable plate 3 is overlaid on the fixed plate 2 while being turned upside down.

The state of arrangement of the upper guiding rail 41 and the upper slidable block 44 with respect to the movable plate 3 is identical with the state of arrangement of the lower guiding rail 40 and the lower slidable block 43 with respect to the fixed plate 2. Note that, the upper guiding rail 41 is arranged along a direction orthogonal to the lower guiding rail 40. Specifically, the upper guiding rail 41 is arranged along the diagonal line connecting the corner portion 2b and the corner portion 2d of the fixed plate 2 in FIG. 2, and this diagonal line matches with the Y direction of the present invention.

Further, as illustrated in FIG. 1, the upper slidable block 44 mounted onto the upper guiding rail 41 is fixed to the coupling plate 45, and is integrated with the lower slidable block 43 to construct the guiding member 42. Accordingly, the movable plate 3 is freely movable in the Y direction relative to the guiding member 42. Between the coupling plate 45 and the movable plate 3, a plurality of elastic members 8 formed of coil springs are provided. The state of arrangement of the elastic members 8 with respect to the movable plate 3 is identical with the state of arrangement of the elastic members 5 with respect to the fixed plate 2. Specifically, the elastic members 8 are stretched so that their tensile force is reduced most greatly when the upper slidable block 44 is set at the center position of the movable plate 3 (hereinafter, referred to as "initial position"). Therefore, when the upper slidable block 44 moves from the initial position toward any one of the end portions along the upper guiding rail 41, the tensile force of each elastic member 8 increases, and therefore the upper slidable block 44 is pulled back to the initial position along the upper guiding rail 41. In other words, the upper slidable block 44 vibrates in the Y direction with the initial position set as the center.

Further, a pair of Y-directional circulation belts 9 are stretched on the movable plate 3, and the Y-directional circulation belts 9 are connected to the coupling plate 45. Further, rotary dampers 10 are respectively fixed at a pair of corner portions of the movable plate 3 opposed across the upper guiding rail 41. Rotationally driven members 100 are fixed to rotors of the rotary dampers 10, and the Y-directional circulation belts 9 are looped around the rotationally driven members 100, respectively. Therefore, when the upper slidable block 44 moves in the Y direction along the upper guiding rail 41, the Y-directional circulation belts 9 connected to the coupling plate 45 circulate and move along a predetermined path, to thereby impart rotational motion to the rotationally driven members 100 provided to the rotary dampers 10 in accordance with the Y-directional movement amount of the coupling plate 45. Further, rotational resistance generated by each rotary damper 10 acts on the circulatory movement of the Y-directional circulation belt 9, and eventually acts as a resistance force to the Y-directional movement of the upper slidable block 44. In other words, the Y-directional vibrations of the upper slidable block 44 are damped by the rotary damper 10.

The elastic members 8, the Y-directional circulation belts 9, and the rotary dampers 10 are arranged on the movable plate totally in the same manner as the elastic members 5, the X-directional circulation belts 6, and the rotary dampers 7 are arranged on the fixed plate. Note that, the direction of arrangement of the upper guiding rail is orthogonal to the direction of arrangement of the lower guiding rail, and hence the rotary dampers 10 are arranged on the movable plate 3 correspondingly to the corner portion 2a and the corner portion 2c of the fixed plate in FIG. 2.

Note that, FIG. 1 is a sectional view obtained by cutting the dumping vibration isolating table 1 along the line I-I of FIG. 2. Therefore, FIG. 1 does not illustrate the rotary dampers 7 and the elastic members 5 provided to the fixed plate 2, and as for the upper guiding rail 41 arranged on the movable plate 3, FIG. 1 illustrates the cross section thereof that is perpendicular to the longitudinal direction.

Further, the dumping vibration isolating table 1 of this embodiment structured as described above is to be used in such a manner that the fixed plate 2 is installed on a floor surface of a building or a transportation vehicle, whereas a vibration isolation subject such as a precision apparatus and an art object is placed on the movable plate 3.

For example, when vibrations act on the floor surface due to transportation, an earthquake, or the like, the vibrations of the floor surface are propagated to the vibration isolation subject through the intermediation of the fixed plate 2 and the movable plate 3, with the result that the vibration isolation subject also vibrates. However, as described above, the movable plate may freely vibrate in the X direction and in the Y direction relative to the fixed plate, and the movable plate 3 may vibrate irrespective of the amplitude and cycle of the vibrations of the fixed plate 2. Therefore, the movable plate 3 on which the vibration isolation subject is placed is held in a state of being isolated from the vibrations of the fixed plate 2, and may be swayed with vibrations having a longer cycle than the vibrations of the floor surface without any restriction of the vibrations of the floor surface. Accordingly, it is possible to effectively prevent damage to the vibration isolation subject due to the vibrations of the floor surface.

When the movable plate 3 vibrates in the X direction relative to the fixed plate 2, the lower slidable block 43 and the coupling plate 45 reciprocate in the X direction along the lower guiding rail 40, and hence the X-directional circulation belts 6 connected to the coupling plate 45 advance and retreat in response to the X-directional vibrations of the movable plate 3, to thereby rotate the rotationally driven members 70. The rotary dampers 7 provided to the fixed plate impart the rotational resistance to the rotationally driven members 70, and hence the rotational resistance acts as a force for holding the X-directional reciprocating motion of the coupling plate 45 with pressure through the intermediation of the X-directional circulation belts 6, with the result that the X-directional vibrations of the movable plate 3 relative to the fixed plate 2 are damped.

Further, when the movable plate 3 vibrates in a similar manner in the Y direction relative to the fixed plate 2, the movable plate 3 reciprocates in the Y direction on the guiding member 42 together with the upper guiding rail 41, and hence the Y-directional circulation belts 9 connected to the coupling plate 45 advance and retreat in response to the Y-directional vibrations of the movable plate, to thereby rotate the rotationally driven members 100. The rotary dampers 10 provided to the movable plate 3 impart the rotational resistance to the rotationally driven members 100, and hence the rotational resistance acts as a force for holding the Y-directional reciprocating motion of the coupling plate 45 with pressure through the intermediation of the Y-directional circulation belts 9, with the result that the Y-directional vibrations of the movable plate 3 relative to the fixed plate 2 are damped.

In other words, when the movable plate 3 vibrates in the X direction and in the Y direction relative to the fixed plate 2, the vibrations are damped by the rotary dampers 7 provided to the fixed plate 2 and the rotary dampers 10 provided to the movable plate 3. When the vibrations acting from the floor surface onto the fixed plate 2 cease, it is possible to quickly cease the vibrations of the movable plate 3 relative to the fixed plate 2.

At this time, the rotary dampers 7 exert the force for holding the X-directional movement of the movable plate 3 with pressure, whereas the rotary dampers 10 exert the force for holding the Y-directional movement of the movable plate 3 with pressure. Thus, the rotary dampers 7 and 10 exert a function of increasing the static rigidity of the movable plate 3 relative to the fixed plate 2. Therefore, the movable plate 3 does not shift relative to the fixed plate 2 when the force only slightly acts on the movable plate 3. Accordingly, it is possible to overcome the problem in that the vibration isolation subject placed on the movable plate 3 is swayed relative to the floor surface in response to the vibrations slightly acting on the floor surface.

Further, the rotary damper that utilizes, as a damping force, the shearing frictional force acting on the viscous fluid exerts a larger damping force as the rotational speed of the rotor increases. Therefore, during the period in which the movable plate 3 is vibrating relative to the fixed plate 2, the damping force of the rotary damper 7 becomes the maximum when the guiding member 42 passes through the initial position of the lower guiding rail 40, and the damping force of the rotary damper 10 becomes the maximum when the guiding member 42 passes through the initial position of the upper guiding rail 41. Thus, it is possible to quickly cease the vibrations of the movable plate 3 by causing the damping force of each of the rotary dampers 7 and 10 to effectively act on the vibrations.

Further, in the dumping vibration isolating table 1 of this embodiment, the X-directional circulation belts 6, the Y-directional circulation belts 9, and the rotary dampers 7 and 10 are housed in the gap between the fixed plate and the movable plate that are overlaid one on top of the other through the intermediation of the guiding member 42, and hence the dumping vibration isolating table 1 can be constructed with its size reduced greatly.

Next, description is given of a vibration isolating table unit obtained by combining the vibration isolating table with damping mechanism of the present invention with a vibration isolating table with inertial mass.

When vibrations having a large amplitude act from the floor surface onto the fixed plate 2, the amplitude of the vibrations of the movable plate 3 relative to the fixed plate 2 tends to increase in accordance therewith. The increase in amplitude of the vibrations of the movable plate 3 relative to the fixed plate 2 corresponds to an increase in amounts of the X-directional and Y-directional movement of the movable plate 3 relative to the fixed plate 2. Hence, in order to isolate the vibration isolation subject from the vibrations of the floor surface, it becomes necessary to ensure sufficient lengths of the lower guiding rail 40 and the upper guiding rail 41. However, when sufficient lengths are set for the lower guiding rail 40 and the upper guiding rail 41, the fixed plate 2 and the movable plate 3 are upsized by an amount corresponding to the lengths thus set. As a result, for example, even in a case where the vibration isolation subject to be placed on the movable plate 3 is small in size, the dumping vibration isolating table 1 sized suitably for this vibration isolation subject cannot be provided. Further, there is a problem in that, when the amplitude of the vibrations of the movable plate 3 relative to the fixed plate 2 is large, a large allowance of space is necessary around the dumping vibration isolating table 1 to avoid interference with the movable plate 3.

Thus, from the viewpoint of downsizing the dumping vibration isolating table 1 while adapting the dumping vibration isolating table 1 to the input of large vibrations, it is conceived that a vibration isolating table with inertial mass (hereinafter, referred to as "inertial mass table") for reducing the amplitude of vibrations is used in combination with the dumping vibration isolating table.

As a structure of the inertial mass table, there is conceived a structure that directly employs the basic structure of the dumping vibration isolating table 1 illustrated in FIG. 1, except that the rotary dampers 7 and 10 respectively mounted onto the fixed plate and the movable plate are replaced with inertial masses.

Figure 4:
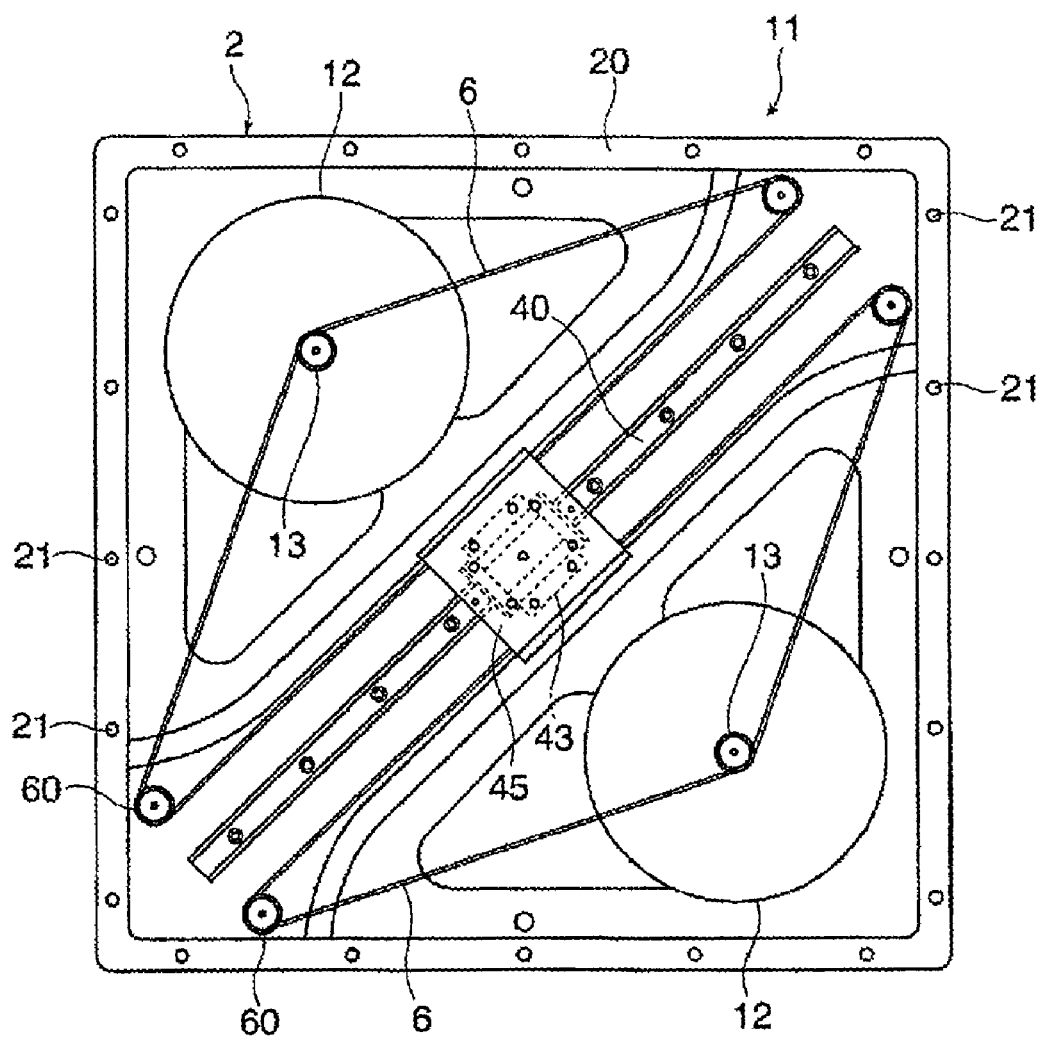
FIG. 4 A plan view illustrating an example of an embodiment of a vibration isolating table with inertial mass to be used in combination with the vibration isolating table with damping mechanism illustrated in FIG. 1.

FIG. 4 is a plan view illustrating a structure of an inertial mass table 11 that directly employs the structure of the dumping vibration isolating table 1 illustrated in FIG. 1, and illustrates, similarly to FIG. 2, a state in which the coupled state of the upper slidable block 44 with respect to the coupling plate 45 of the guiding member 42 is released and the movable plate 3 is removed from the fixed plate 2. In FIG. 4, reference numeral 12 represents an inertial mass, which is provided in place of the rotary damper 7 of the dumping vibration isolating table 1. The inertial mass 12 is a disc made of a metal and having a uniform thickness, and the center of the inertial mass 12 is borne so as to be freely rotatable relative to the fixed plate 2. In addition, a pulley 13 serving as a rotationally driven member is fixed to one end of the rotation shaft of the inertial mass 12. The X-directional circulation belt 6 stretched on the fixed plate 2 is looped around the pulley 13. The inertial mass 12 is formed to have a thickness smaller than the height of the coupling plate 45 with respect to the fixed plate 2, and is housed in the gap between the fixed plate 2 and the movable plate 3 when the movable plate 3 is overlaid on the fixed plate 2.

Note that, components other than the inertial mass 12 are the same as those of the above-mentioned dumping vibration isolating table 1, and therefore represented by the same reference symbols in FIG. 4 to omit detailed description thereof.

Further, FIG. 4 illustrates only the structure in which components are mounted onto the fixed plate 2, and the structure in which components are mounted onto the movable plate 3 is totally the same as well. Similarly to the dumping vibration isolating table 1, the vibration control table 11 is completed by overlaying the movable plate 3 on the fixed plate 2 through the intermediation of the guiding member 42.

Figure 5:
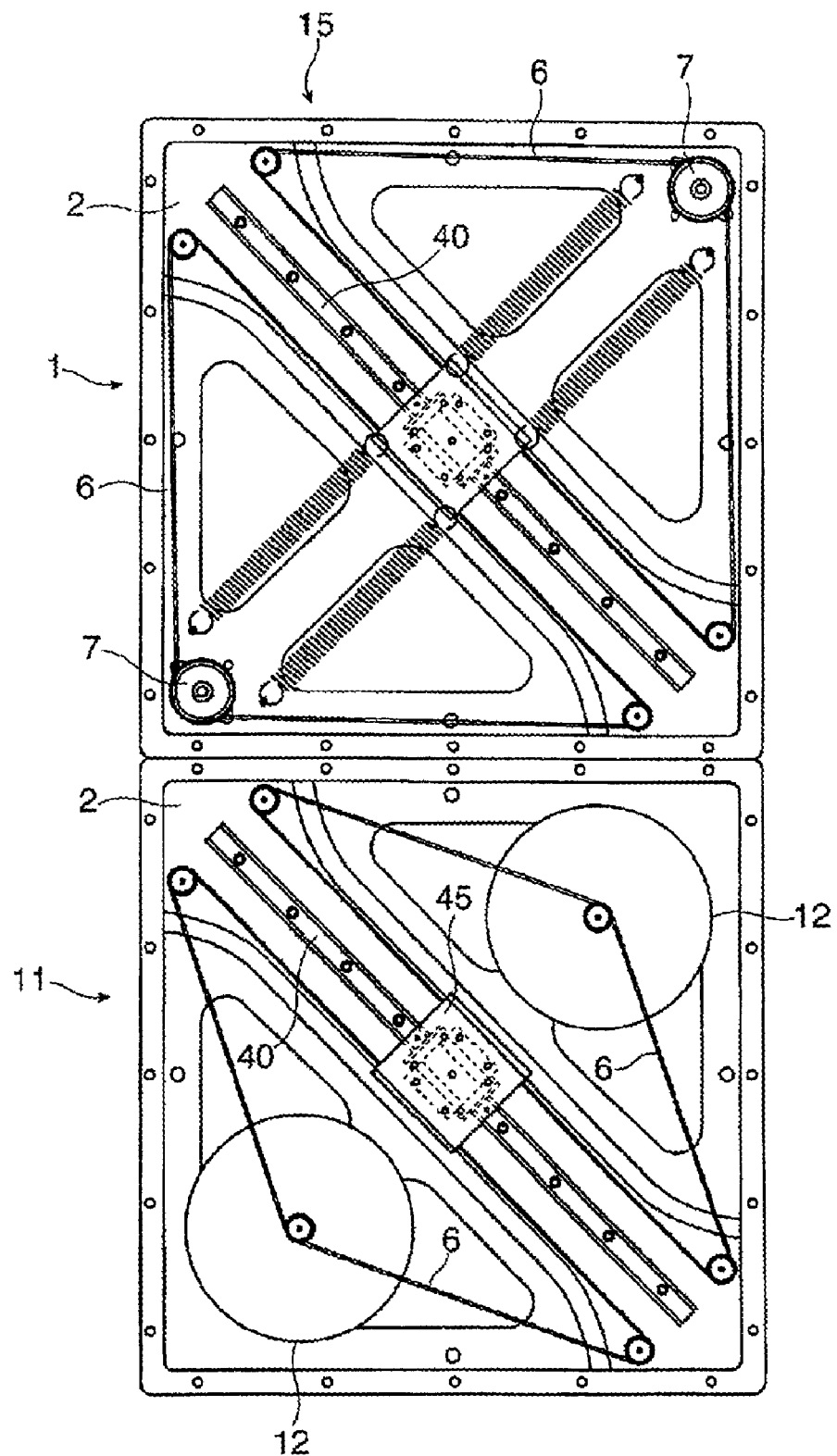
FIG. 5 A plan view illustrating an example of a structure on the fixed plate side of a vibration isolating table unit constructed of the vibration isolating table with damping mechanism illustrated in FIG. 2 and the vibration isolating table with inertial mass illustrated in FIG. 4 which are coupled to each other.

As illustrated in FIG. 5, the inertial mass table 11 is used by connecting the inertial mass table 11 to the above-mentioned dumping vibration isolating table 1 to construct a vibration isolating table unit 15. At this time, the fixed plates and the movable plates of the dumping vibration isolating table 1 and the inertial mass table 11 are coupled together, respectively, and the movable plates of the dumping vibration isolating table 1 and the inertial mass table 11 are integrated with each other to vibrate in the X direction and in the Y direction relative to the respective fixed plates. Note that, FIG. 5 illustrates a state in which the fixed plate of the dumping vibration isolating table 1 and the fixed plate of the inertial mass table 11 are coupled to each other.

For example, in the inertial mass table 11, when the movable plate 3 vibrates in the X direction relative to the fixed plate 2, the lower slidable block 43 that constructs the guiding member 42 reciprocates in the X direction along the lower guiding rail 40, and accordingly the X-directional circulation belt 6 repeatedly inverts the rotational direction of the inertial mass 12. In other words, the X-directional movement of the movable plate 3 relative to the fixed plate 2 is converted into rotational motion of the inertial mass 12, and accordingly the amplitude of the X-directional vibrations of the movable plate 3 relative to the fixed plate 2 can be reduced.

Further, the same applies to the Y-directional vibrations of the movable plate 3. When the movable plate 3 vibrates in the Y direction, the inertial mass 12 provided so as to be freely rotatable relative to the movable plate 3 repeatedly inverts its rotational direction, and the Y-directional movement of the movable plate 3 relative to the fixed plate 2 is converted into rotational motion of the inertial mass 12. Accordingly, the amplitude of the Y-directional vibrations of the movable plate 3 relative to the fixed plate 2 can be reduced.

That is, by coupling the inertial mass table 11 to the dumping vibration isolating table 1, the amplitude of the vibrations of the movable plate 3 relative to the fixed plate 2 can be reduced by the vibration isolating table unit 15 as a whole. Thus, it is expected that the vibration isolating table unit 15 itself be downsized and the allowance of space around the vibration isolating table unit 15 be reduced.

In FIG. 5, one inertial mass table 11 is coupled to one dumping vibration isolating table 1 to construct the vibration isolating table unit 15. However, the number of dumping vibration isolating tables 1 and inertial mass tables 11 to be coupled together may be selected as appropriate depending on the required size of the movable plate 3, the weight of the vibration isolation subject to be placed on the movable plate 3, and the like. That is, according to the vibration isolating table unit 15 described above, by arbitrarily coupling the dumping vibration isolating table 1 and the inertial mass table 11 to each other, it is possible to freely construct the vibration isolating table unit 15 suitable for the size and weight of the vibration isolation subject, and hence such a vibration isolating table unit 15 may flexibly support any kinds of vibration isolation subjects.

Further, a vibration isolating table having no rotary dampers 7 and 10 or inertial mass 12, that is, a vibration isolating table in which the movable plate 3 is simply borne on the fixed plate 2 through the intermediation of the two-dimensional guiding mechanism 4 (hereinafter, referred to as "basic vibration isolating table"), may be coupled to the dumping vibration isolating table 1 and the inertial mass table 11 for use.

Figure 6:
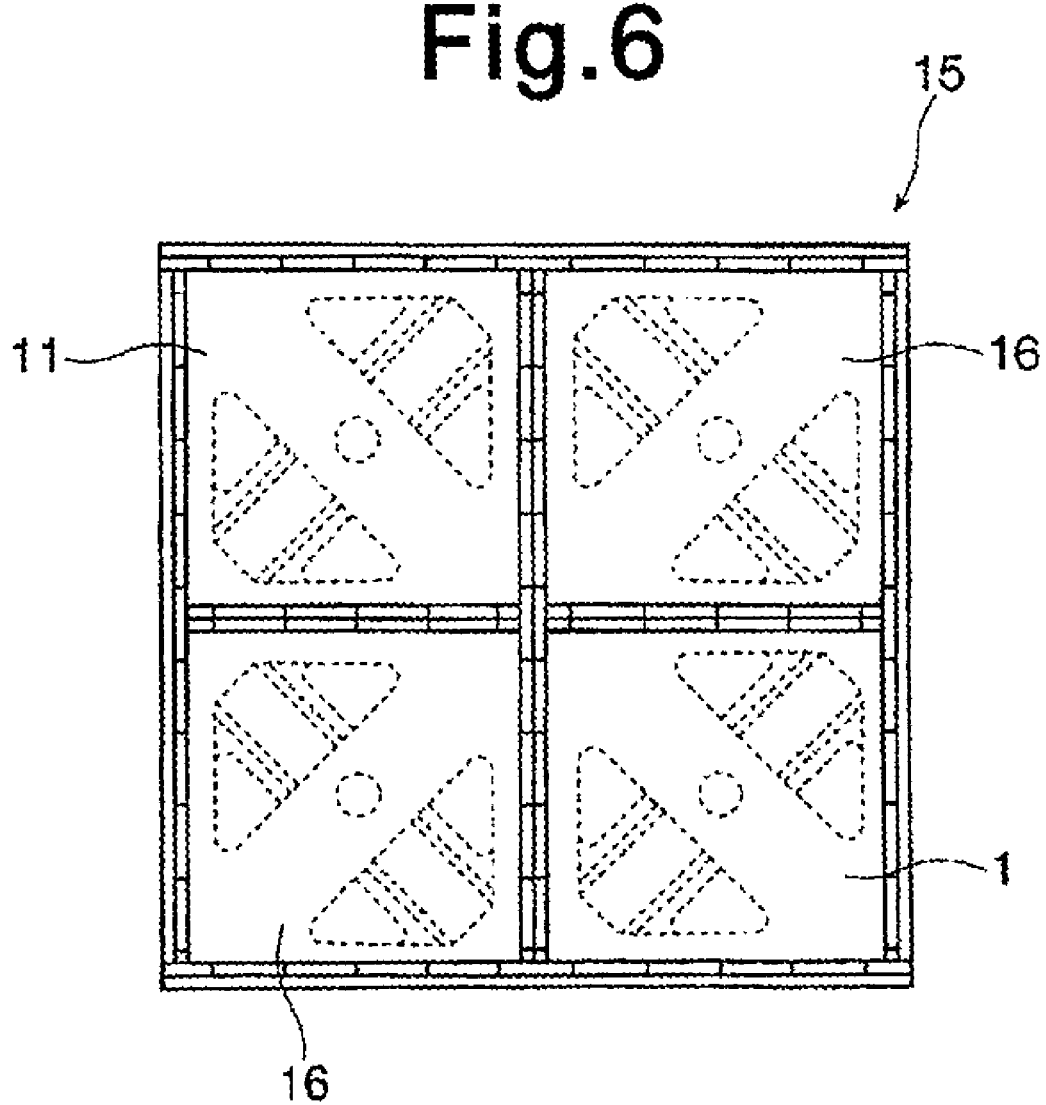
FIG. 6 A plan view illustrating another combination adopted for the vibration isolating table unit.

FIG. 6 illustrates an example of the vibration isolating table unit 15 constructed by coupling together one dumping vibration isolating table 1, one inertial mass table 11, and two basic vibration isolating tables 16. In this manner, when an arbitrary number of dumping vibration isolating tables 1, inertial mass tables 11, and basic vibration isolating tables 16 are coupled together to construct the vibration isolating table unit 15, it is possible to freely construct the vibration isolating table unit 15 suitable for the size, weight, robustness, and the like of the vibration isolation subject to be placed on the movable plate, and to control the amplitude of vibrations occurring in the movable plate and the damping characteristics of the vibrations.

The invention claimed is:

1. A vibration isolating table with damping mechanism, comprising:
   a fixed plate having four corner portions to be formed into a substantially rectangular shape, the four corner portions including a pair of opposing corner portions defining a diagonal line that matches with an X direction, and another pair of opposing corner portions defining another diagonal line that matches with a Y direction orthogonal to the X direction;
   a guiding member provided so as to be freely movable in the X direction relative to the fixed plate;
   a movable plate on which a vibration isolation subject is to be placed, the movable plate having four corner portions to be formed into a substantially rectangular shape, the movable plate being provided so as to be freely movable relative to the guiding member in the Y direction, and freely movable within a plane parallel to the fixed plate;
   a plurality of elastic members provided between the fixed plate and the guiding member, the plurality of elastic members being configured to pull the movable plate shifted relative to the fixed plate back to an initial position;
   a plurality of elastic members provided between the movable plate and the guiding member, the plurality of elastic members being configured to pull the movable plate shifted relative to the fixed plate back to the initial position;
   rotary dampers arranged at the another pair of opposing corner portions of the fixed plate situated on the another diagonal line that matches with the Y direction;
   rotary dampers arranged at a pair of corner portions of the movable plate situated on the diagonal line that matches with the X direction; X-directional circulation belts loop around driven members in a manner that rotationally drives the members which are provided to the rotary dampers of the fixed plate, the X-directional circulation belts being stretched into a circular shape along a predetermined path including a route parallel to the diagonal line of the fixed plate that matches with the X direction, the X-directional circulation belts being configured to circulate in accordance with X-directional movement of the guiding member relative to the fixed plate; and
   Y-directional circulation belts looped around rotationally driven members provided to the rotary dampers of the movable plate, and stretched into a circular shape along a predetermined path including a route parallel to the another diagonal line of the movable plate that matches with the Y direction, the Y-directional circulation belts being configured to circulate in accordance with Y-directional movement of the movable plate relative to the guiding member.

2. The vibration isolating table with damping mechanism according to claim 1, wherein the X-directional circulation belts, the Y-directional circulation belts, the rotary dampers of the fixed plate, and the rotary dampers of the movable plate are housed in a gap between the fixed plate and the movable plate that are overlaid one on top of another through the intermediation of the guiding member.

3. The vibration isolating table with damping mechanism according to claim 2, wherein the plurality of elastic members of the fixed plate are coupled to the fixed plate at a position on an inner side of the predetermined path of the X-directional circulation belts, and the plurality of elastic members of the movable plate are coupled to the movable plate at a position on an inner side of the predetermined path of the Y-directional circulation belts.

4. The vibration isolating table with damping mechanism according to claim 2, wherein the plurality of elastic members of the fixed plate are provided between the guiding member and the another pair of opposing corner portions of the fixed plate at which the rotary dampers of the fixed plate are arranged, and the plurality of elastic members of the movable plate are provided between the guiding member and the pair of corner portions of the movable plate at which the rotary dampers of the movable plate are arranged.

5. The vibration isolating table with damping mechanism according to claim 1, wherein the plurality of elastic members of the fixed plate are coupled to the fixed plate at a position on an inner side of the predetermined path of the X-directional circulation belts, and the plurality of elastic members of the movable plate are coupled to the movable plate at a position on an inner side of the predetermined path of the Y-directional circulation belts.

6. The vibration isolating table with damping mechanism according to claim 5, wherein the plurality of elastic members of the fixed plate are provided between the guiding member and the another pair of opposing corner portions of the fixed plate at which the rotary dampers of the fixed plate are arranged, and the plurality of elastic members of the movable plate are provided between the guiding member and the pair of corner portions of the movable plate at which the rotary dampers of the movable plate are arranged.

7. The vibration isolating table with damping mechanism according to claim 1, wherein the plurality of elastic members of the fixed plate are provided between the guiding member and the another pair of opposing corner portions of the fixed plate at which the rotary dampers of the fixed plate are arranged, and the plurality of elastic members of the movable plate are provided between the guiding member and the pair of corner portions of the movable plate at which the rotary dampers of the movable plate are arranged.

8. A vibration isolating table unit, comprising:
the vibration isolating table with damping mechanism according to claim 1; and
a vibration isolating table with inertial mass to be used in a state of being coupled to the vibration isolating table with damping mechanism,
wherein the vibration isolating table with inertial mass comprises an inertial mass provided in place of the rotary dampers of the vibration isolating table with damping mechanism.

\* \* \* \* \*